United States Patent

Cometto et al.

[11] Patent Number: 5,972,486
[45] Date of Patent: Oct. 26, 1999

[54] LLDPE-BASED STRETCHABLE MULTILAYER FILMS

[75] Inventors: Claudio Cometto, Bologna; Gianni Perdomi, Ferrara; Camillo Cagnani, Dovadola, all of Italy

[73] Assignee: Montell Technology Company b.v., Hoofddorp, Netherlands

[21] Appl. No.: 08/747,684

[22] Filed: Nov. 12, 1996

[30] Foreign Application Priority Data

Nov. 14, 1995 [IT] Italy .................................. MI95A2330

[51] Int. Cl.$^6$ ....................................................... B32B 27/32
[52] U.S. Cl. ........................... 428/213; 428/516; 525/240
[58] Field of Search ..................... 428/500, 516, 428/213; 525/240

[56] References Cited

U.S. PATENT DOCUMENTS

| | | | |
|---|---|---|---|
| 4,218,339 | 8/1980 | Zucchini et al. | 252/429 B |
| 4,472,520 | 9/1984 | Zucchini et al. | 502/104 |
| 4,521,566 | 6/1985 | Galli et al. | 525/247 |
| 4,748,221 | 5/1988 | Collomb et al. | 526/901 |
| 4,803,251 | 2/1989 | Goode et al. | 525/429 B |
| 5,407,732 | 4/1995 | Dokurno | 428/516 |
| 5,419,934 | 5/1995 | Wilson | 428/34.9 |
| 5,455,303 | 10/1995 | Panagopoulos et al. | 525/95 |
| 5,561,195 | 10/1996 | Govoni et al. | 525/240 |

FOREIGN PATENT DOCUMENTS

| | | |
|---|---|---|
| 395083 | 10/1990 | European Pat. Off. . |
| 400333 | 12/1990 | European Pat. Off. . |
| 472-946 | 3/1992 | European Pat. Off. . |
| 553805 | 8/1993 | European Pat. Off. . |
| 553806 | 8/1993 | European Pat. Off. . |
| WO 93/03078 | 2/1993 | WIPO . |
| WO 95/20009 | 7/1995 | WIPO . |

*Primary Examiner*—Paul Thibodeau
*Assistant Examiner*—D. Lawrence Tarazano
*Attorney, Agent, or Firm*—Bryan Cave LLP

[57] ABSTRACT

Stretchable multilayer films in which at least one layer comprises:

a) a linear low density polyethylene (LLDPE),
b) a copolymer of propylene with ethylene and/or with one or more α-olefins $CH_2$=$CHR^I$, in which $R^I$ is an alkyl radical having from 2 to 10 carbon atoms, this copolymer being of relatively high insolubility in xylene; and
c) a low density polyethylene (LDPE).

The said films, which have improved optical and mechanical properties, are particularly suitable for use in the packaging sector.

16 Claims, No Drawings

LLDPE-BASED STRETCHABLE MULTILAYER FILMS

The present invention relates to stretchable multilayer films which have improved optical and mechanical properties.

In particular, the invention relates to stretchable multilayer films in which at least one layer comprises: (a) a linear low density polyethylene (LLDPE), (b) a copolymer of propylene with ethylene and/or with one or more α-olefins $CH_2=CHR^I$, in which $R^I$ is an alkyl radical having from 2 to 10 carbon atoms, this copolymer being of relatively high insolubility in xylene; and (c) a low density polyethylene (LDPE).

The use of stretchable films in the field of wrapping and packaging of goods constitutes an application of significant commercial importance. The reason for this is that wrappings and packaging made of polymer films allow the goods to be assembled in stable units and in uniform shapes, thereby enabling their transportation to be rationalized and consequently made more economical. Given the large variety of types of goods to be packaged and wrapped, many different properties are required of these films, depending on, among other things, the different packaging techniques used. The general requirements for affording wide applicability are good mechanical properties, for instance tensile strength, puncture strength, load and elongation at tear, and good optical properties, such as transparency (haze) and brightness (gloss). Polymer films moreover need to possess good processability on packaging lines, that is to say that they need to have properties allowing excellent control over the stretching operation in order to prevent rupture during the packaging processes. It is moreover preferable for these films to be as economical as possible so that their cost does not have a significant impact on the packaged product sold to the public. Therefore, in order to be capable of wide application, the films should possess a variety of properties which are not always mutually compatible.

Many different polymers have been used in the past for the purposes of obtaining films capable of satisfying these requirements.

Recently, the use of LLDPE has constituted an important development in this field, in view of its excellent characteristics in terms of mechanical properties and processability.

Nevertheless, films exclusively comprising LLDPE do not possess an entirely satisfactory combination of properties. Moreover, the LLDPEs which give the best performance are those modified with 1-hexene or 1-octene, which have substantially higher production costs than LLDPEs modified with butene. Various solutions have therefore been proposed, including mono- or multilayer films obtained from compositions comprising LLDPE mixed with other components. U.S. Pat. No. 5,419,934 describes a stretchable multilayer film comprising two outer layers and one inner layer. The inner layer comprises a composition consisting of LLDPE in an amount ranging from 5 to 15% and a polymer chosen from propylene homopolymers and copolymers, or mixtures thereof, in amounts of between 85 and 95%. The two outer layers comprise an LLDPE which has properties different from those of the LLDPE used in the inner layer, optionally mixed with other components such as EVA or LDPE. U.S. Pat. No. 5,407,732 describes stretchable multilayer films comprising three layers consisting of a polyolefin composition comprising LLDPE and LDPE. One of the outer layers contains between 70 and 98% LLDPE, the amount in the inner layer is between 65 and 35% and the other outer layer contains between 90 and 99% LLDPE.

However, the whole of the properties displayed by these films is not entirely satisfactory. Indeed, it is known that when LDPE is mixed with LLDPE, the product obtained is of inferior mechanical properties.

International patent application WO 95/20009 describes polyolefin compositions of high processability comprising (a) from 75 to 95% by weight of a copolymer of ethylene with an α-olef in $CH_2=CHR$, where R is an alkyl radical having from 1 to 10 carbon atoms, the said ethylene copolymer containing up to 20 mol % of α-olefin $CH_2=CHR$; and (b) from 5 to 25% by weight of a copolymer of propylene with ethylene and with at least one α-olefin $CH_2=CHR^I$, where $R^I$ is an alkyl radical having from 2 to 10 carbon atoms. The copolymer (b) contains from 80 to 98% by weight of propylene, from 1 to 10% by weight of ethylene and from 1 to 10% by weight of α-olefin $CH_2=CHR^I$ and is characterized by an insolubility in xylene of greater than 70%. The said application does not mention the possibility of obtaining stretchable multilayer films in which at least one layer is composed of a polyolefin composition of the type described mixed with a low density polyethylene (LDPE).

There is therefore a need for polymer films capable of satisfying the requirements for wide-scale applicability.

It has now been found, surprisingly, that stretchable multilayer films in which at least one layer of the films com prises: (a) an LLDPE; (b) a propylene copolymer of defined insolubility properties in xylene; and, (c) a low density polyethylene (LDPE), possess an excellent combination of optical and mechanical properties and are therefore capable of wide-scale use.

The stretchable multilayer films of the present invention are characterized in that at least one layer of the films comprises:
(a) from 80 to 100 parts by weight of a copolymer of ethylene with one or more α-olefins $CH_2=CHR$, where R is an alkyl radical having from 1 to 10 carbon atoms, the said ethylene copolymer having a density of between 0.88 and 0.945 g/cm$^3$, a melt index of from 0.1 to 10 g/10' and containing up to 20 mol % of α-olefin $CH_2=CHR$;
(b) from 5 to 30 parts by weight of a copolymer of propylene with ethylene and/or one or more α-olefins $CH_2=CHR^I$, where $R^I$ is a hydrocarbon radical having from 2 to 10 carbon atoms, the said propylene copolymer containing from 60 to 98% by weight of propylene and having an insolubility in xylene of greater than 70%; and
(c) from 0.3 to 30 parts by weight of a low density polyethylene (LDPE).

The copolymer (a) is preferably present in an amount of between 85 and 95 parts by weight and has a density preferably of between 0.89 and 0.94 g/cm$^3$. These values are more preferably between 0.90 g/cm$^3$ and 0.935 g/cm$^3$.

The melt index (determined according to ASTM method D-1238, condition E) of the copolymer (a) has values generally of between 0.1 and 10 g/10 minutes, preferably of between 0.2 and 5 g/10 minutes, more preferably of between 0.2 and 3 g/10 minutes.

The α-olefin $CH_2=CHR$ may be selected, for example, from propylene, 1-butene, 1-hexene, 1-octene and 4-methyl-1-pentene; 1-butene or 1-hexene is preferably used. In the prep aration of the component (a), the olefins $CH_2=CHR$ may also be used mixed together.

Copolymer (a) is prepared by copolymerization of ethylene with an α-olefin $CH_2=CHR$, in the presence of a catalyst of Ziegler-Natta type obtained by reaction of an organometallic compound of a metal from groups II and III of the Periodic Table of the Elements with a catalytic component comprising a compound of a transition metal belonging to groups IV, V or VI of the Periodic Table of the Elements. The transition metal compound is preferably supported on a solid support comprising a magnesium halide in activated form. Examples of catalysts which can be used in the preparation of the copolymer (a) are described in U.S. Pat. NO. 4,218,339 and U.S. Pat. No. 4,472,520, the description of which is included herein by way of reference. The catalysts can also be prepared according to the methods described in U.S. Pat. Nos. 4,748,221 and 4,803,251.

Other examples of catalysts are described in patent applications EP-A-395,083, EP-A-553,805 and EP-A-553,806.

The copolymer (b) may be, for example, a propylene/ethylene, propylene/butene or propylene/hexene copolymer. It is preferably a terpolymer of propylene with ethylene and an α-olefin $CH_2=CHR^I$. In this case, its propylene content is between 85 and 96% by weight, the ethylene content is between 2 and 8% by weight and the α-olefin $CH_2=CHR^I$ content is between 2 and 7% by weight. The content of the various components is determined by IR and NMR analysis.

The α-olefin $CH_2=CHR^I$ may be selected, for example, from 1-butene, 1-hexene, 1-octene and 4-methyl-1-pentene, and is preferably 1-butene or 1-hexene.

The high insolubility in xylene is indicative of a stereoregular structure of the propylene units and of homogeneous distribution of the ethylene units and of the α-olefin $CH_2=CHR^I$ in the polymer chains.

The insolubility in xylene, determined according to the method described below, is preferably greater than 75%, more preferably greater than 85%. The heat of fusion of the copolymer (b) is generally greater than 50 J/g, preferably greater than 60 J/g, more preferably greater than 70 J/g. The melting point of the copolymer (b) is below 140° C. and preferably between 120 and 140° C.

The crystalline index of the copolymer (b) is generally greater than 50%.

The melt index (determined according to ASTM method D-1238, condition L) of the copolymer (b) has values generally of between 5 and 1000, preferably of between 5 and 100, more preferably of between 5 and 30.

The copolymers which make up the component (b) can conveniently be prepared using a highly stereospecific catalyst, of the type described in patent application EP-A-395,083, the description of which is included herein by way of reference.

The copolymer (b) is preferably used in amounts of between 5 and 20 parts by weight.

The low density polyethylene used as component (c) of the present invention can be any LDPE. Generally, the said polymers, obtained by high-pressure radical polymerization, have a relative density of between 0.916 and 0.925 and a melt index of between 0.2 and 10 g/10'. In the films of the present invention, the content of the LDPE (c) is preferably between 1 and 17, and more preferably between 3 and 9, parts by weight.

The components (a) and (b) of the present invention can be blended separately before being fed into the extruder by mixing the two components in the molten state, for example in a high-shear mixer.

Preferably, a composition comprising components (a) and (b) is prepared directly by polymerization working in at least two reactors in series in which, working in any order and using the same catalyst in the various reactors, copolymer (a) is synthesized in one of the reactors and copolymer (b) is synthesized in the other. The polymerization is conveniently carried out in the gas phase using fluidized-bed reactors. Examples of products prepared according to this methodology are described in international patent applications WO 93/03078 and WO 95/20009, the descriptions of which are included herein by way of reference.

The multilayer films according to the present invention are preferably prepared by the known technology of film extrusion through a flat head. In particular, in the case of the present multilayer films, two or more parallel extruders, fed with the desired polyolefin compositions, convey the molten material to a flat collecting head provided with a slot from which the superimposed molten layers emerge. The said layers are then extruded onto a rotating cylinder with a cooling facility (chill roll) which allows solidification of the extrudate with formation of the polymer film. The spin speed of the chill roll can be adjusted so as to provide films of the desired thickness.

In general, the thickness of the films ranges from 10 to 50 μm, preferably from 20 to 40 μm and more preferably from 23 to 35 μm.

The films obtained by the process described above consist of two or more layers of identical or different composition.

One particular aspect of the present invention relates to cast stretchable multilayer films in which at least two layers are of the same composition comprising components (a), (b) and (c) as described above.

A further aspect of the present invention relates to cast stretchable films comprising at least two layers which differ from each other in composition. At least one layer comprises the components (a), (b) and (c) as defined above and at least one layer consists essentially of components (a) and (b) as defined above.

In this case, the two layers may be present in the film in different ratios. Generally, the weight ratio between the two layers is between 20:1 and 1:20, preferably between 10:1 and 1:10.

Cast stretchable multilayer films with a structure of the type ABA, in which between the two outer layers A is placed an intermediate layer B of different composition, are particularly preferred.

The outer layers A comprise:
(a) from 80 to 100 parts by weight of a copolymer of ethylene with one or more α-olefins $CH_2=CHR$, where R is an alkyl radical having from 1 to 10 carbon atoms, the said ethylene copolymer having a density of between 0.88 and 0.945 g/cm$^3$, a melt index of from 0.1 to 10 g/10' and containing up to 20 mol % (weight) of α-olefin $CH_2=CHR$;
(b) from 5 to 30 parts by weight of a copolymer of propylene with ethylene and/or one or more α-olefins $CH_2=CHR^I$, where $R^I$ is a hydrocarbon radical having from 2 to 10 carbon atoms, the said propylene copolymer containing from 60 to 98% by weight of propylene and having an insolubility in xylene of greater than 70%; and
(c) from 0.3 to 30, preferably between 1 and 17, and more preferably between 3 and 9, parts by weight of a low density polyethylene (LDPE);
the inner layer B comprises:
(a) from 80 to 100 parts by weight of a copolymer of ethylene with one or more α-olefins $CH_2=CHR$, where R is an alkyl radical having from 1 to 10 carbon atoms, the said ethylene copolymer having a density of between 0.88 and 0.945 g/cm$^3$, a melt index of from 0.1 to 10 g/10' and containing up to 20 mol % of α-olefin $CH_2=CHR$;
(b) from 5 to 30 parts by weight of a copolymer of propylene with ethylene and/or one or more α-olefins $CH_2=CHR^I$, where $R^I$ is a hydrocarbon radical having from 2 to 10 carbon atoms, the said propylene copolymer containing from 60 to 98% by weight of propylene and having an insolubility in xylene of greater than 70%.

The various layers can be present in variable amounts relative to the total weight of the film. Preferably, each of the two outer layers is present in amounts generally ranging from about 5 to about 45% relative to the total weight of the film. More preferably, each outer layer is present in amounts of between 10 and 30%. The two outer layers are preferably present in equal parts.

A further aspect of the present invention is represented by cast stretchable films of the type AAA in which the three layers are of the same composition comprising the components (a), (b) and (c) as described above. The said films display particularly advantageous properties from the mechanical (tensile modulus, load and elongation at yield) and optical (haze and gloss) points of view. Moreover, when subjected to wrapping tests, these films demonstrated extremely good behaviour with excellent control of stretching and no tears. In particular, it is surprising that with the addition of LDPE the films of the present invention show not only better optical properties but also better mechanical properties when compared with the films obtained with the compositions (a)+(b).

The weight ranges described for the components present in the layers of the films of the present invention refer to the relative weight ratios of the components (a), (b) and (c). obviously, in accordance with what is known by those skilled in the art or as may readily be determined by routine tests, further polymeric components, additives (such as, for example, adhesives, stabilizers, antioxidants, anti-corrosion agents, etc.) and fillers, of either organic or inorganic nature, that are capable of imparting specific properties to the films of the invention may be added. Residues obtained by trimming the films produced may also be among the various components which may be added. The said residues are generally reintroduced in the central extruder.

The examples which follow are given by way of illustration of the invention, without any limitation being implied.

EXAMPLES

The properties indicated were determined according to the following methods:

Composition of the polymers: weight percentage of the various monomers determined by I.R.;

Insolubility in xylene: 2 g of polymer are dissolved in 250 cm$^3$ of xylene at 135° C. with stirring. After 20 minutes the solution is left to cool with continued stirring until it reaches a temperature of 25° C. After 30 minutes the insoluble polymer precipitated is separated out by filtration. The solvent is removed from the solution by evaporation under a stream of nitrogen and the residue is dried under vacuum at 80° C. until the weight remains constant. In this way, the percentage of polymer soluble in xylene at 25° C. is calculated and, consequently, the percentage of insoluble polymer is determined;

Density: ASTM D 1505;
Melt Index E (MIE): ASTM D 1238, condition E;
Melt Index F (MIF): ASTM D 1238, condition F;
Melt Index L (MIL): ASTM D 1238, condition L;
F/E: ratio between melt index F and melt index E;
Haze: ASTM D 1003;
Elmendorf Tear Strength: ASTM D 1922, determined both in the direction of the machine (MD) and in the transverse direction (TD);
Max. puncture force and maximum puncture deformation: the maximum force (expressed in N) and the deformation of the film (expressed in mm) which are required to perforate a film using a punch with a hemispherical head which penetrates the film at constant speed are measured. The analysis time is 1 hour at a temperature of 23° C.

Equipment

The dynamometer used is of the Instron mod. 4301 type or equivalent. The thickness gauge used is of the Mitutoyo type or equivalent. The punch used is 50 mm long with a hemispherical head 4 mm in diameter.

Method

A sample of film 50 mm in width and 200 mm in length is placed in a thermostatically-controlled environment at a temperature of 23° C. After placing the film in the sample holder, compression of the punch into the film is started at a speed of 20 mm/minute. The test is repeated at 5 different points on the sample, with a separation of at least 3 mm between each point.

Elongation at yield:: ASTM D 882
Load at yield: ASTM D 882
Elongation at tear: ASTM D 882
Tensile modulus: ASTM D 882
Gloss: ASTM D 2457

The composition (a)+(b) used in the examples reported was obtained directly by polymerization working in two reactors in the gas phase, as described in international patent application WO 95/20009. The composition comprises 86% of component (a) in which the α-olefin is 1-butene, 14% of component (b), which is a terpolymer of propylene with ethylene and 1-butene having an insolubility in xylene of greater than 70%. The resulting composition has a MIE of 2 and a relative density of 0.912.

The low density polyethylene (LDPE) used in the examples is marketed by Enichem under the name Riblene FL30 and has a relative density of 0.924 and an MIE of 2.1.

Example 1

A stretchable multilayer film of the ABA type with a thickness of about 30 μm was prepared according to the method described above, using a Dolci cast film line fitted with two Dolci 70 extruders for the outer layers and a Dolci 120 extruder for the inner layer. The composition of the film is given in Table 1, while the results of the tests to which it was subjected are given in Table 2.

Example 2

A stretchable multilayer film of the ABA type with a thickness of about 30 microns was prepared according to the method and with the apparatus used in Example 1. The composition of the film is given in Table 1 while the results of the tests to which it was subjected are given in Table 2.

Example 3

A stretchable multilayer film of the AAA type with a thickness of about 30 microns was prepared according to the method and with the apparatus used in Example 1. The composition of the film is given in Table 1 while the results of the tests to which it was subjected are given in Table 2.

Example 4 (comparative)

A stretchable multilayer film of the AAA type with a thickness of about 30 microns was prepared according to the method and with the apparatus used in Example 1. The composition of the film is given in Table 1 while the results of the tests to which it was subjected are given in Table 2.

TABLE 1

|  | Ex. 1 | | | Ex. 2 | | | Ex. 3 | | | Ex. 4 (Comparison) | | |
| --- | --- | --- | --- | --- | --- | --- | --- | --- | --- | --- | --- | --- |
| % in the total film | A | B | A | A | B | A | A | A | A | A | A | A |
|  | 15 | 70 | 15 | 15 | 70 | 15 | 15 | 70 | 15 | 15 | 70 | 15 |
| Components |  |  |  |  |  |  |  |  |  |  |  |  |
| (a) + (b) (%) | 90 | 100 | 90 | 80 | 100 | 80 | 97 | 97 | 97 | 100 | 100 | 100 |
| (c) (%) | 10 |  | 10 | 20 |  | 20 | 3 | 3 | 3 |  |  |  |

TABLE 2

|  |  | EX. 1 | Ex. 2 | Ex. 3 | Ex. 4 (Comparison) |
| --- | --- | --- | --- | --- | --- |
| Elmendorf |  |  |  |  |  |
| MD | N | 0.8 | 0.6 | 0.6 | 1 |
| TD |  | 3.9 | 4 | 3.6 | 3.2 |
| Max. puncture force |  |  |  |  |  |
| Puncture | N | 6 | 6.1 | 6 | 6 |
| deformation | mm | 14.7 | 14 | 14 | 15 |
| 2% tensile modulus dry |  |  |  |  |  |
| MD | MPa | 125 | 128 | 123 | 109 |
| TD |  | 123 | 132 | 134 | 116 |
| Load at yield |  |  |  |  |  |
| MD | MPa | 8.4 | 10.4 | 9.8 | 8.5 |
| TD |  | 7 | 7.2 | 8.4 | 7.8 |
| Elongation at yield |  |  |  |  |  |
| MD | % | 32.3 | 38.8 | 27 | 24.1 |
| TD |  | 22.6 | 19.2 | 26 | 21.5 |
| Haze |  | 1.4 | 1.4 | 1.2 | 2.4 |
| Gloss |  | 87 | 87.6 | 87.6 | 83.6 |
| (*) wrapping test |  | excellent | excellent | excellent | excellent |

(*) The performance in the wrapping tests was evaluated by taking into account the control of the stretching, of the absence of tear, of the sealing of sharp corners and of the sealing of the wrapping.

We claim:

1. Cast stretchable multilayer films comprising two outer layers and at least one inner layer, the outer layers comprising:
   (a) from 80 to 100 parts by weight of a copolymer of ethylene with one or more α-olefins $CH_2$=CHR, where R is an alkyl radical having from 1 to 10 carbon atoms, the ethylene copolymer having a density of between 0.88 and 0.945 $g/cm^3$, a melt index of from 0.1 to 10 g/10', and containing up to 20 mol % of α-olefin $CH_2$=CHR;
   (b) from 5 to 30 parts by weight of a copolymer of propylene with ethylene and/or one or more α-olefins $CH_2$=CHR', where R' is a hydrocarbon radical having from 2 to 10 carbon atoms, the propylene copolymer containing from 60 to 98% by weight of propylene and having an insolubility in xylene of greater than 70%; and
   (c) from 0.3 to 30 parts by weight of a low density polyethylene (LDPE) and the inner layer consists essentially of components (a) and (b) as defined above.

2. Cast films according to claim 1, in which each of the two outer layers is present in amounts of between 5 and 45% relative to the total weight of the film.

3. Cast films according to claim 1, in which each of the two outer layers is present in amounts of between 10 and 30% relative to the total weight of the film.

4. Cast films according to claim 1, in which the component (c) used in the outer layers is present in an amount of between 1 and 17 parts by weight.

5. Cast films according to claim 1, in which the component (c) has a relative density of between 0.916 $g/cm^3$ and 0.925 $g/cm^3$ and an MIE of between 0.2 and 10 g/10'.

6. Cast films according to claim 1, having a thickness of between 20 and 40 μm.

7. Cast films according to claim 1, in which the copolymer (a) is present in amounts of between 85 and 95 parts by weight and has a relative density of between 0.89 $g/cm^3$ and 0.94 $g/cm^3$.

8. Cast films according to claim 1, in which the copolymer (b) is present in amounts of between 5 and 20 parts by weight, and has a propylene content of between 85 and 96% by weight, an ethylene content of between 2 and 8% by weight and an α-olefin $CH_2$=CHR' content of between 2 and 7% by weight.

9. Cast stretchable multilayer films comprising two outer layers and at least one inner layer, the outer layers comprising:
   (a) from 80 to 100 parts by weight of a copolymer of ethylene with one or more α-olefins $CH_2$=CHR, where R is an alkyl radical having from 1 to 10 carbon atoms, the ethylene copolymer having a density of between 0.88 and 0.945 g/cm$^3$, a melt index of from 0.1 to 10 g/10', and containing up to 20 mol % of α-olefin CH$_2$=CHR;

(b) from 5 to 30 parts by weight of a copolymer of propylene with ethylene and/or one or more α-olefins CH$_2$=CHR$^I$, where R$^I$ is a hydrocarbon radical having from 2 to 10 carbon atoms, the propylene copolymer containing from 60 to 98% by weight of propylene and having an insolubility in xylene of greater than 70%; and (c) from 10 to 30 parts by weight of a low density polyethylene (LDPE) and the inner layer comprises components (a) and (b) as defined above.

10. Cast films according to claim 9, in which each of the two outer layers is present in amounts of between 5 and 45% relative to the total weight of the film.

11. Cast films according to claim 9, in which each of the two outer layers is present in amounts of between 10 and 30% relative to the total weight of the film.

12. Cast films according to claim 9, in which component (c) has a relative density of between 0.916 and 0.925 and an MIE of between 0.2 and 10 g/10'.

13. Cast films according to claim 9, having a thickness of between 20 and 40 μm.

14. Cast films according to claim 9, having a thickness of between 23 and 35 μm.

15. Cast films according to claim 9, in which copolymer (a) is present in amounts of between 85 and 95 parts by weight and has a relative density of between 0.89 and 0.94.

16. Cast films according to claim 9, in which copolymer (b) is present in amounts of between 5 and 20 parts by weight, and has a propylene content of between 85 and 96% by weight, an ethylene content of between 2 and 8% of weight and an α-olefin CH$_2$=CHR$^I$ content of between 2 and 7% by weight.

* * * * *